United States Patent [19]

Gambrell

[11] Patent Number: 4,684,379
[45] Date of Patent: Aug. 4, 1987

[54] AIR CLEANER ASSEMBLY

[75] Inventor: David E. Gambrell, Piedmont, S.C.

[73] Assignee: Thermo Kinetics Industries, Inc., Greenville, S.C.

[21] Appl. No.: 795,865

[22] Filed: Nov. 7, 1985

[51] Int. Cl.⁴ .............................................. B01D 47/02
[52] U.S. Cl. ........................................ 55/227; 55/229;
55/228; 55/440; 55/355; 137/403
[58] Field of Search ................. 55/257 PV, 227, 229,
55/228, 355, 440; 137/403, 855

[56] References Cited
U.S. PATENT DOCUMENTS

| | | | |
|---|---|---|---|
| 808,897 | 1/1906 | Carrier | 55/257 PV |
| 885,185 | 4/1908 | Serrell | 55/227 |
| 1,223,082 | 4/1917 | Lissauer | 55/227 |
| 1,333,855 | 3/1920 | Lissauer | 55/228 |
| 3,460,168 | 4/1969 | Bruyne | 137/855 |
| 4,053,292 | 10/1977 | Schneider et al. | 55/227 |

Primary Examiner—Bernard Nozick
Attorney, Agent, or Firm—Bailey & Hardaway

[57] ABSTRACT

An air cleaner is illustrated having a transverse support carrying an eliminator blade assembled in a raised position above a downwardly inclined housing bottom. A means is provided for creating a seal for preventing the passage of air in the space beneath the eliminator blade assembled so as to bypass the eliminator utilizing a controlled level of liquid to establish the seal.

3 Claims, 3 Drawing Figures

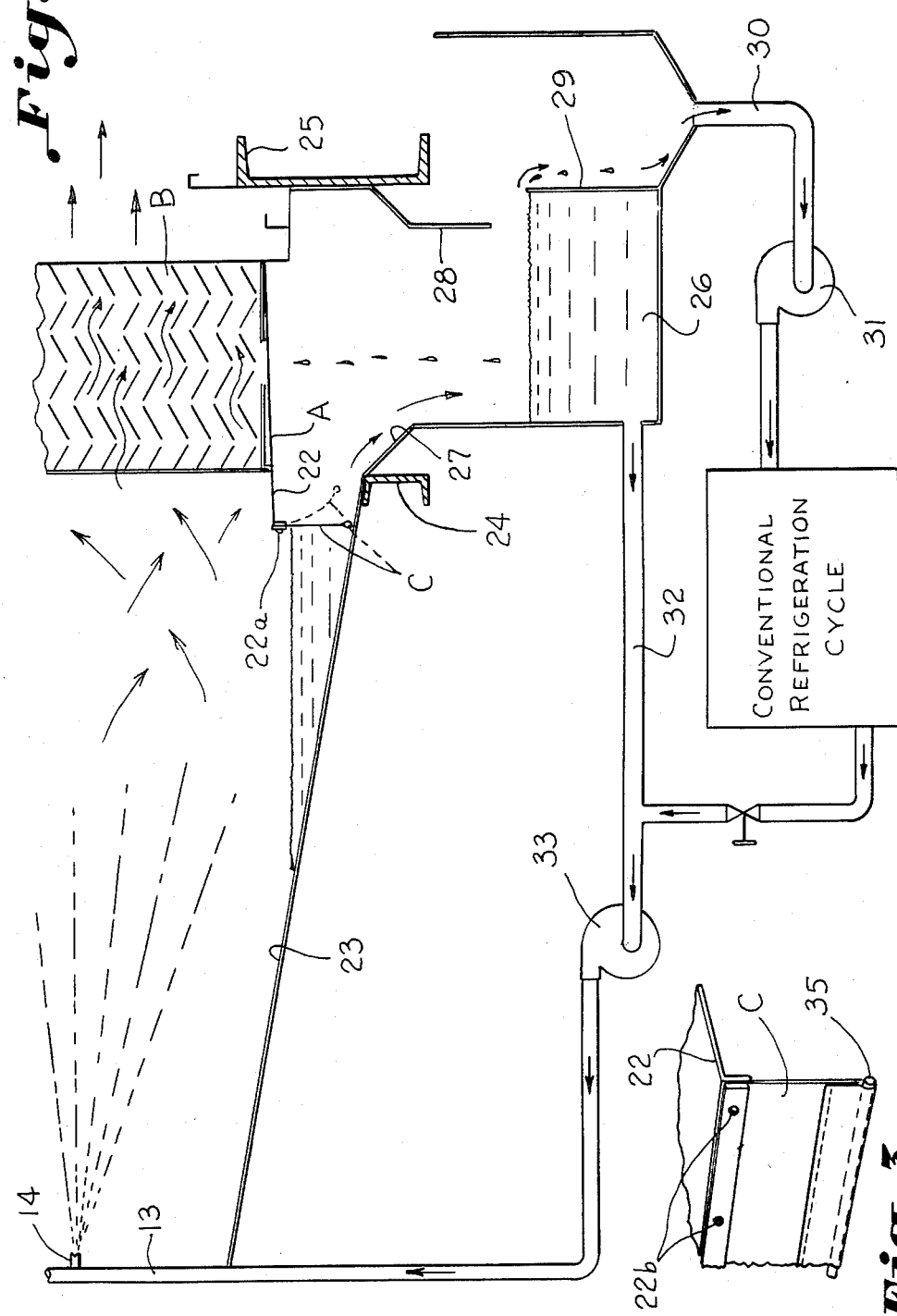

AIR CLEANER ASSEMBLY

BACKGROUND OF THE INVENTION

It is a standard practice in an eliminator blade assembly such as illustrated in U.S. Pat. No. 3,864,110 to provide an eliminator section which utilizes a liquid seal which comprises the immersion of the lower portion of eliminator blades in a tank provided for collecting spray water. Such a seal prevents the passage of air around the lower portion of the eliminator by reducing the effectiveness of the eliminator blades since the lower portion is not available for use. Moreover, trash and scum has a tendency to collect on the blade portion immersed in the wash water, and this has a tendency to reduce the effectiveness of the eliminator blades.

Accordingly, it is an important object of the present invention to provide means for raising the eliminator section out of the liquid while providing an effective liquid seal to prevent bypassing of the eliminator section through air flow beneath the eliminator blade assembly.

Another important object of the invention is to avoid the collection of trash upon the eliminator blades as it would reduce their effectiveness and enhance maintenance problems and the cost attendant thereto.

SUMMARY OF THE INVENTION

It has been found that a transverse support may be provided for positioning an eliminator blade assembly in a raised position above a downwardly inclined bottom of the air washer housing. A liquid level is established in the housing by creating a seal for preventing the passage of air through the space beneath the eliminator blade assembly which includes a gate in the form of a flap retaining liquid within the housing. The gate is movable when the liquid reaches such a level as to flex or move the gate to permit excess liquid to pass beneath the eliminator blade assembly.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 2 is an enlarged schematic elevation illustrating the eliminator section and related parts of an air cleaner constructed in accordance with the present invention, and FIG. 3 is an enlarged perspective view illustrating the construction of a gate or flap which is useful in creating a liquid seal beneath the eliminator section.

DESCRIPTION OF A PREFERRED EMBODIMENT

Figure 1:
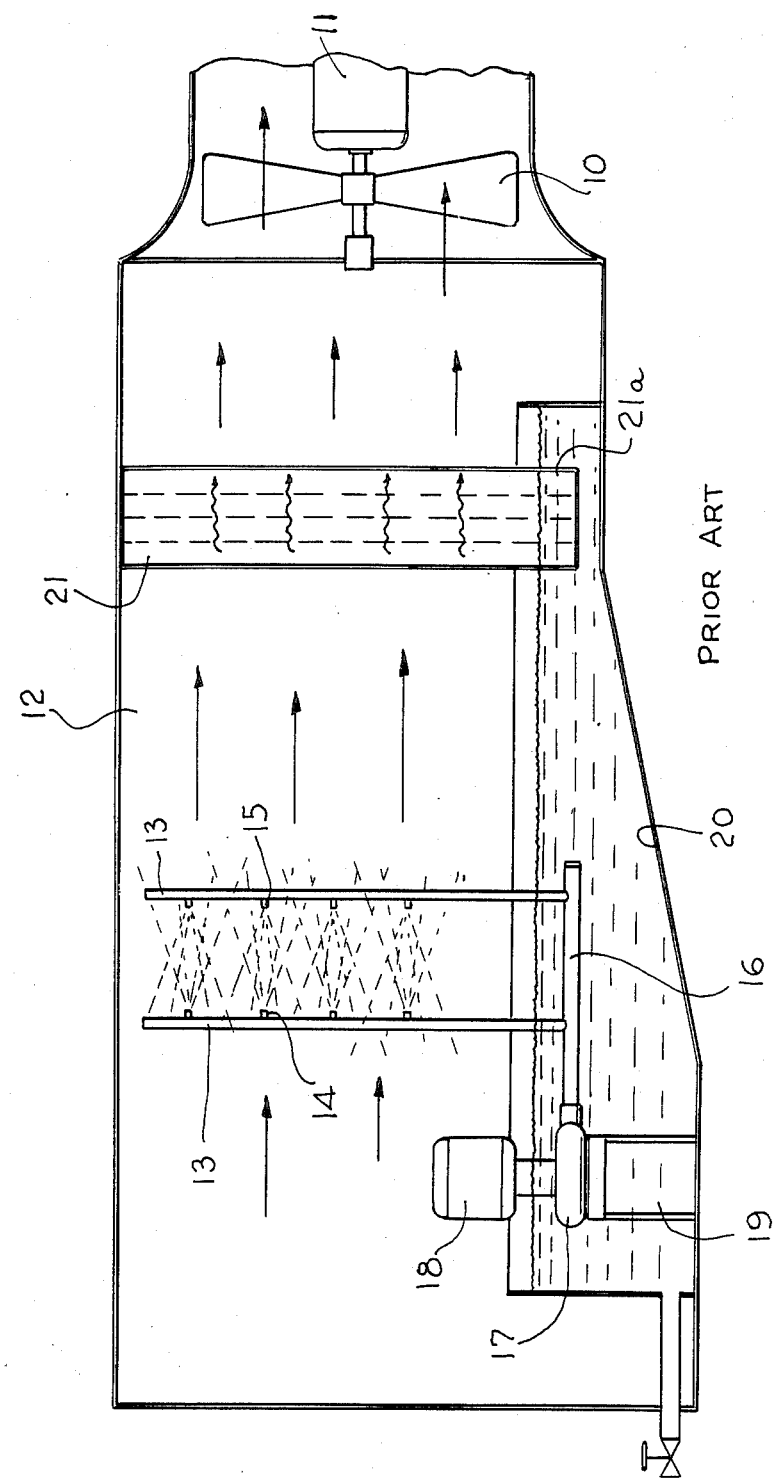
FIG. 1 is a schematic side elevation illustrating an air cleaner constructed in accordance with the prior art.

FIG. 2 illustrates an air cleaner having an elongated housing with a bottom for retaining liquid, a liquid spray section in the housing, an eliminator blade assembly and means moving air longitudinally through the spray section for washing and the eliminator blade assembly for removing liquid. A transverse support A is provided for positioning the eliminator blade assembly B in raised position above the bottom creating a space beneath the eliminator blade assembly. Means C is provided for establishing a liquid level in the housing for creating a seal preventing the passage of air through the space beneath said eliminator blade assembly. The means C establishing a liquid level includes a gate positioned adjacent the support retaining the liquid in the housing. The gate is movable when the liquid reaches a predetermined level for permitting excess liquid to pass beneath the eliminator blade assembly. The gate includes a flexible flap suspended on an upper edge swingable for displacement when the liquid reaches the predetermined level. The bottom of the housing is inclined downwardly toward the space for discharging liquid when released by displacement of the flap.

FIG. 1 illustrates a conventional air washer or cleaner wherein a fan having blades 10 is driven by a motor for pulling air through a substantially rectangular housing 12. The housing 12 contains a spray section having hedders 13 which carry nozzles 14 which direct a spray in the direction of air flow as well as nozzles 15 which direct spray in a direction opposed to air flow. The spray arrangement creates an area where the air is subjected to washing action with an attempt to create a uniform spray across the air flow. The hedders have connection with a pipe 16 connected to a pump 17 driven by a motor 18. The pump is supported as at 19 within a tank or sump portion of 20 which collects wash water which falls from the spray as well as the collection of liquid from eliminator blades 21 which are included in the eliminator section and which are illustrated as having their lower ends 21a immersed in the water.

During the operation of the air cleaner the water level in the tank varies somewhat causing dirt and grime from the collected wash water to accumulate on a lower portion of the eliminator blades. Such contamination reduces the effectiveness of the eliminator blades and results in the necessity of frequent cleaning and replacement of the blades.

FIG. 2 illustrates an eliminator section constructed in accordance with the present invention wherein a support A which includes a structural member having a web 22 located transversely of the housing supports the eliminator section B. The floor 23 of the housing inclines downwardly toward the eliminator section and is supported by a frame member 24. The larger frame member 25 serves to reinforce and support the air washer structure as a whole. A tank 26 is provided for collecting water which flows downwardly from the eliminator blades having been removed from the moisture laden air of the air washer. The tank 26 receives liquid which flows from the bottom 23 over a weir-like portion 27 to the tank. A collector 28 provides an opposite wall to weir 27 for collecting the liquid within the tank 26. The liquid flows over a second weir 29 into a collector pipe 30 for pumping as at 31 to a refrigeration cycle where such liquid joins liquid in the pipe 32 from the tank 26. Both flows of liquids are pumped as at 33 to the hedders 13 and nozzles 14 of the spray section.

The gate or flap C may be flexed from solid line position to dotted line position in FIG. 2. FIGS. 2 and 3 show a depending flange 22a for serving as a support at the upper edge of the flap. The flange 22a is provided to fastening means in the form of levels 22b (FIG. 3) for connecting the flap for extending downwardly to serve as a seal for the water collected in the bottom of the housing. The flap is constructed from flexible material such as may be used for roof covering material. A rod 35 is carried at the bottom of the flap to maintain the flap in downwardly extended position and is swingable when the water level reaches a predetermined level to create sufficient head to dislodge the flap permitting water to flow over the weir surface 27 into the tank 26. It is thus seen that the effective area of the eliminator blades has been increased while avoiding fouling of the lower portions of the eliminator blades. By removing the lower portion of the eliminator blades from the water, the collection of foreign materials thereon is avoided thus reducing the cleaning requirements and maintenance, including replacement of parts which become corroded or damaged during the cleaning procedures.

While a preferred embodiment of the invention has been described using specific terms, such description is for illustrative purposes only, and it is to be understood that changes and variations may be made without departing from the spirit or scope of the following claims.

What is claimed is:

1. An air cleaner having an elongated housing including an air inlet and an air outlet, a bottom for retaining liquid, a liquid spray section in said housing, an eliminator blade assembly and means moving air longitudinally through said spray section for washing and said eliminator blade assembly for removing liquid comprising:
   a transverse support for positioning said eliminator blade assembly in raised position above said bottom creating a space beneath said eliminator blade assembly;
   means establishing a liquid level in said housing for creating a seal preventing the passage of air through said space beneath said eliminator blade assembly;
   said means establishing a liquid level including a gate connected adjacent said support and extending between said support and said bottom retaining said liquid in said housing, and
   said gate being movable when said liquid reaches a predetermined level for permitting excess liquid to pass beneath said eliminator blade assembly.

2. The structure set forth in claim 1 wherein said gate is a flexible flap suspended on an upper edge swingable from said support for displacement when said liquid reaches said predetermined level.

3. The structure set forth in claim 2 wherein said bottom is inclined downwardly toward said space for discharging liquid when released by displacement of said flap.

* * * * *